(12) United States Patent
Falk et al.

(10) Patent No.: US 10,908,800 B2
(45) Date of Patent: Feb. 2, 2021

(54) DYNAMIC GRAPHICAL USER INTERFACE FOR ANALYZING SENSOR CAPTURED DATA

(71) Applicant: Orbital Insight, Inc., Palo Alto, CA (US)

(72) Inventors: Matthew Falk, Palo Alto, CA (US); Maxim Ladonnikov, Palo Alto, CA (US); Rochit Sapra, Palo Alto, CA (US); Christopher K. Koverman, Mountain View, CA (US)

(73) Assignee: Orbital Insight, Inc., Palo Alto, CA (US)

( * ) Notice: Subject to any disclaimer, the term of this patent is extended or adjusted under 35 U.S.C. 154(b) by 0 days.

(21) Appl. No.: 16/377,116

(22) Filed: Apr. 5, 2019

(65) Prior Publication Data

US 2020/0319783 A1 Oct. 8, 2020

(51) Int. Cl.
*G06F 3/0484* (2013.01)
*G06F 3/0482* (2013.01)
(Continued)

(52) U.S. Cl.
CPC ........ *G06F 3/04847* (2013.01); *G06F 3/0482* (2013.01); *G06F 16/29* (2019.01);
(Continued)

(58) Field of Classification Search
CPC .. G06F 3/04847; G06F 3/0482; G06F 3/0484; G06F 16/54; G06F 16/29;
(Continued)

(56) References Cited

U.S. PATENT DOCUMENTS 8,799,799 B1 * 8/2014 Cervelli ................. G06T 11/60
715/765
8,995,716 B1 * 3/2015 Zomet ............... G06K 9/00664
382/103

(Continued)

FOREIGN PATENT DOCUMENTS

JP 2007018408 A * 1/2007

OTHER PUBLICATIONS

Coldewey, Devin, "Terrapattern is reverse image search for maps, powered by a neural network" (May 25, 2016), TechCrunch, Accessed Apr. 30, 2020, https://techcrunch.com/2016/05/25/terrapattern-is-a-neural-net-powered-reverse-image-search-for-maps/ (Year: 2016).*
(Continued)

*Primary Examiner* — Kieu D Vu
*Assistant Examiner* — Rami R Okasha
(74) *Attorney, Agent, or Firm* — Fenwick & West LLP

(57) ABSTRACT

A system and a method are disclosed for identifying features in a geographic area captured by a sensor. A server transmits computer readable instructions to a client device to cause the client device to display a first graphical element including data entry user interface elements for inputting one or more parameters. The server receives one or more data inputs corresponding to the one or more parameters. In response to receipt of the data inputs, the server transmits computer readable instructions to cause the client device to display a timeline graphical user interface element identifying detections of a feature in data captured for the geographic area. The data captured for the geographic area is selected based on the identified parameters and the timeline graphical user interface is segment into multiple display elements based on the identified parameters.

13 Claims, 10 Drawing Sheets

(51) Int. Cl.
*G06K 9/46* (2006.01)
*G06F 16/587* (2019.01)
*G06F 16/29* (2019.01)
*G06F 16/54* (2019.01)
*G06K 9/62* (2006.01)

(52) U.S. Cl.
CPC ............ *G06F 16/54* (2019.01); *G06F 16/587* (2019.01); *G06K 9/4609* (2013.01); *G06K 9/6253* (2013.01)

(58) Field of Classification Search
CPC ...... G06F 16/587; G06K 9/6253; G06K 9/46; G06K 9/4609
See application file for complete search history.

(56) References Cited

U.S. PATENT DOCUMENTS

| | | | | |
|---|---|---|---|---|
| 9,021,384 | B1* | 4/2015 | Beard | G06F 16/248 |
| | | | | 715/781 |
| 9,123,086 | B1* | 9/2015 | Freeland | G06F 16/583 |
| 9,547,872 | B2* | 1/2017 | Howard | G01C 21/3682 |
| 9,552,334 | B1* | 1/2017 | Meisels | G06Q 50/01 |
| 9,686,646 | B1* | 6/2017 | Pecard | H04W 4/02 |
| 10,084,828 | B2* | 9/2018 | Sorin | H04L 65/1069 |
| 10,102,597 | B1* | 10/2018 | Castonguay | G06Q 50/16 |
| 10,275,140 | B1* | 4/2019 | Miller | G06F 3/04847 |
| 10,387,487 | B1* | 8/2019 | Svendsen | H04W 4/021 |
| 10,453,226 | B1* | 10/2019 | Burrows | G06T 11/206 |
| 10,460,602 | B1* | 10/2019 | Dorne | G08G 1/13 |
| 2006/0090141 | A1* | 4/2006 | Loui | G06F 16/447 |
| | | | | 715/764 |
| 2007/0245238 | A1* | 10/2007 | Fugitt | G06F 3/0481 |
| | | | | 715/700 |
| 2008/0085053 | A1* | 4/2008 | Cerosaletti | G06K 9/00624 |
| | | | | 382/190 |
| 2008/0292212 | A1* | 11/2008 | Ozaki | G06F 16/51 |
| | | | | 382/284 |
| 2009/0060263 | A1* | 3/2009 | Tsutsui | G01C 21/20 |
| | | | | 382/100 |
| 2010/0064239 | A1* | 3/2010 | Crawford | G06F 16/44 |
| | | | | 715/771 |
| 2010/0305844 | A1* | 12/2010 | Choi | G01C 21/3423 |
| | | | | 701/533 |
| 2011/0007094 | A1* | 1/2011 | Nash | G06F 16/50 |
| | | | | 345/634 |
| 2011/0173193 | A1* | 7/2011 | Ahn | G06F 16/2428 |
| | | | | 707/725 |
| 2012/0005045 | A1* | 1/2012 | Baker | G06F 3/04842 |
| | | | | 705/27.2 |
| 2012/0213416 | A1* | 8/2012 | Lorimer | G06F 16/29 |
| | | | | 382/113 |
| 2013/0094718 | A1* | 4/2013 | Icho | G06K 9/00476 |
| | | | | 382/113 |
| 2013/0110841 | A1* | 5/2013 | Sathish | G06F 16/41 |
| | | | | 707/741 |
| 2013/0243250 | A1* | 9/2013 | France | G06K 9/46 |
| | | | | 382/103 |
| 2013/0298083 | A1* | 11/2013 | Bertoldo | G06F 3/0482 |
| | | | | 715/835 |
| 2013/0338453 | A1 | 12/2013 | Duke et al. | |
| 2014/0007017 | A1* | 1/2014 | Sternfeld | G06F 16/29 |
| | | | | 715/848 |
| 2014/0304582 | A1* | 10/2014 | Bills | H04W 4/021 |
| | | | | 715/224 |
| 2015/0170403 | A1* | 6/2015 | Barcay | G06K 9/00476 |
| | | | | 345/427 |
| 2015/0178972 | A1* | 6/2015 | Barcay | G06T 17/05 |
| | | | | 345/419 |
| 2016/0034712 | A1* | 2/2016 | Patton | H04L 51/16 |
| | | | | 726/28 |
| 2016/0073233 | A1* | 3/2016 | Wilcox | G06F 3/04842 |
| | | | | 455/414.3 |
| 2016/0098176 | A1* | 4/2016 | Cervelli | G06F 3/04847 |
| | | | | 715/804 |
| 2016/0300375 | A1 | 10/2016 | Beckett et al. | |
| 2016/0306824 | A1 | 10/2016 | Lopez et al. | |
| 2016/0349930 | A1* | 12/2016 | Hazanovich | G11B 27/28 |
| 2017/0052654 | A1* | 2/2017 | Cervelli | G06T 19/006 |
| 2017/0214889 | A1* | 7/2017 | Maciejewski | G06K 9/00758 |
| 2017/0249711 | A1* | 8/2017 | Odegard | G06F 16/23 |
| 2019/0121878 | A1* | 4/2019 | Deng | G06F 3/0485 |

OTHER PUBLICATIONS

Sentinel2Look Viewer, U.S. Geological Survey (May 13, 2017), Help Documentation, Accessed using Wayback Machine on Apr. 28, 2020 and May 6, 2020, https://landsatlook.usgs.gov/sentinel2/ (Year: 2017).*

Terdiman, Daniel, "Ever Want Image Search for Google Earth? This Al-Driven Tool Does That" (Mar. 3, 2017), Fast Company, Robot Revolution, Accessed Apr. 28, 2020 and May 6, 2020, https://www.fastcompany.com/3068768/ever-want-image-search-for-google-earth-this-ai-driven-tool-does-that (Year: 2017).*

PCT International Search Report and Written Opinion, PCT Application No. PCT/2020/026720, dated Jul. 16, 2020, 16 pages.

* cited by examiner

DYNAMIC GRAPHICAL USER INTERFACE FOR ANALYZING SENSOR CAPTURED DATA

TECHNICAL FIELD

This disclosure relates generally to processing of sensor data, and, in particular to, a graphical user interface for configuring a set of search parameters for analyzing a set of sensor captured data to identify features in the data.

BACKGROUND

The knowledge of the size of a population of objects in a given area of interest (AOI) may prove to be a critical information source in many scenarios. For example, estimating the number of people at a given time of day that may be present in a building may assist in disaster planning and evacuation. Estimating an amount of foot traffic in a commercial space may also assist in transportation planning and future commercial development.

While sensor data describing the population of objects may be gathered extensively from a vast number of third-party sources, access to such data is often difficult to acquire for an individual consumer. Individual users may not be able to access imagery without significant resource expenditure. However, such users do not typically require the complete set of data recorded by the entire population of third party sources. For users using conventional systems, identifying particular packets of data which include sensor captured images of interest is a complex and arduous process. A human operator often times manually sifts through all images recorded by one or more third-party entities before identifying which images they are interested in purchasing. Such an approach is arduous and time-consuming. Accordingly, there exists a need for a simplified method of identifying a subset of sensor captured images recorded by third party sources which include information of interest to an individual consumer.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
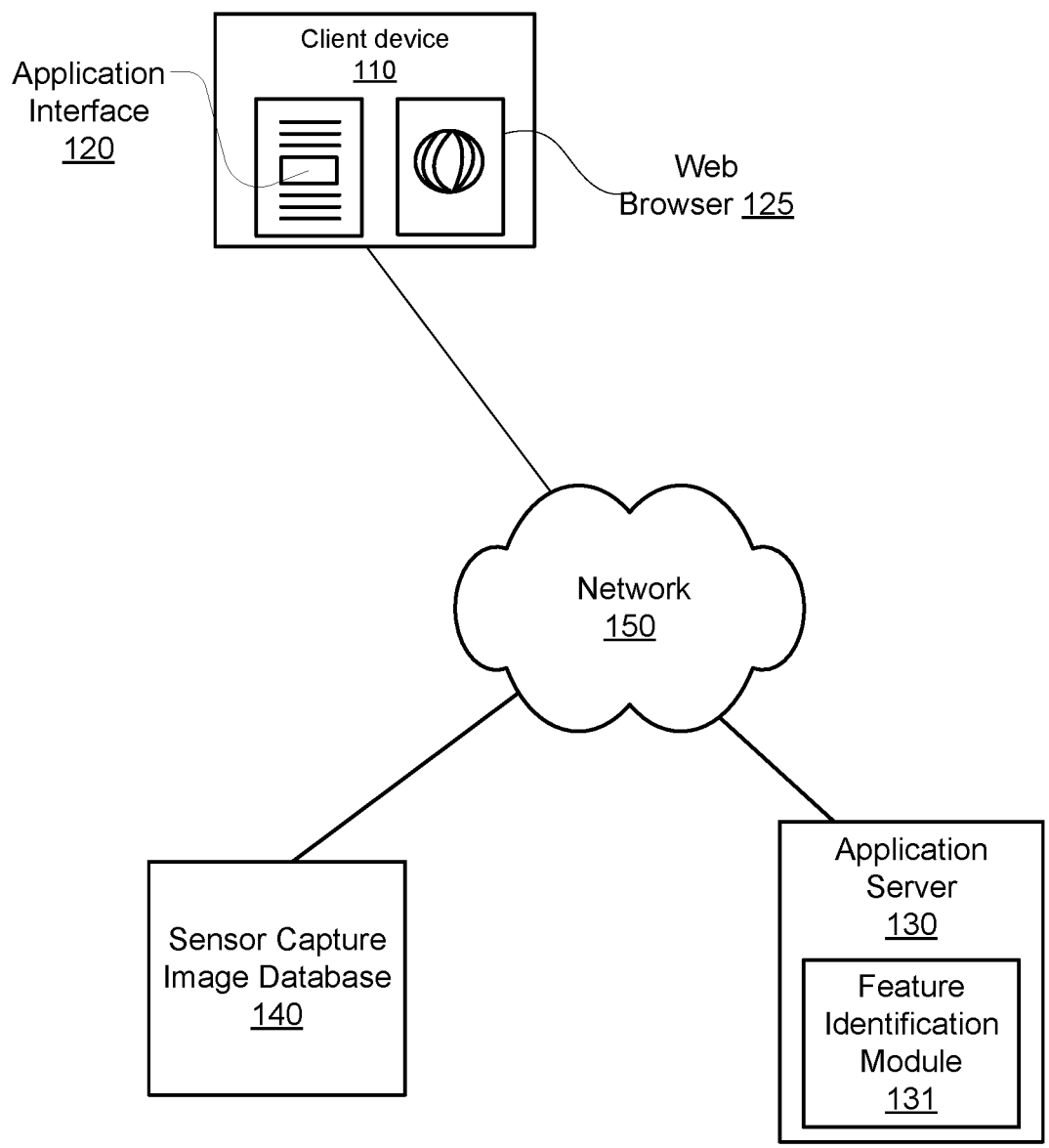
FIG. 1 shows an identification system for identifying one or more sensor captured images recorded by third-parties which include information of interest (i.e., features, objects, or conditions) of interest to a user.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium which receives input from a user identifying a feature of interest and a set of search parameters which define conditions for sensor captured images accessed from a third-party database. Based on the search parameters, a feature detection system identifies a set of sensor captured images of a geographic area including the feature of interest.

In one embodiment, a network server transmits one or more computer readable instructions to a client device. Although a network server is described herein, in other embodiments the instructions and graphical user interface may be generated locally without assistance of a network server. The instructions cause the client device to display a first graphical user interface element for detecting a feature in accessed sensor data, such as captured images, image packets, audio data, and so on, of a geographic area. The first graphical user interface element includes a plurality of data entry user interface elements for inputting a plurality of parameters (i.e., search parameters). The parameters include a time range indicating a duration of time within which the accessed sensor captured images of a geographic region were captured, a sampling period indicating a frequency at which sensor captured images are accessed within the time range, and a time tolerance indicating an interval by which the sampling period is extended. The geographic area and the feature of interest are selected based on inputs received from a user. Additionally, the network server receives a plurality of data inputs corresponding to the data encountered by the user via the data entry user interface elements which specify a time range, a sampling period, and a time tolerance.

Based on the specified search parameters, geographic area, and feature, the network server transmits one or more computer readable instructions to the client which cause the client device to display a second graphical user interface element. The second graphical user interface element includes a geographic spatial graphical user interface element displaying an outline of the geographic area and a plurality of image capture outlines. Each image capture outline represents a sensor captured image of the area captured within the time range. Additionally, the second graphical user interface element includes a timeline graphical user interface element displaying one or more matching image identifier elements. Each matching image identifier element indicates a detection of the feature of interest in one of the accessed sensor captured images of the geographic area. The timeline graphical user interface may further display one or more of the matching image identifier elements within one or more segment graphical elements which are generated based on the sampling periods.

In another embodiment, a system for identifying sensor captured images which include a group or type of feature comprises a sensor data storage subsystem and a feature detection system. The sensor data storage subsystem stores data captured of a geographic area. The feature detection system transmits computer-readable instructions which cause a client device to display a first graphical element. The first graphical element includes data entry interface user interface elements for inputting one or more parameters (i.e., search parameters). A network server hosting the feature detection system receives one or more data inputs corresponding to the one or more parameters and defines each parameter using the inputs. The network server transmits computer readable instructions to the client device, causing the client device to display a timeline graphical user interface element. The timeline graphical user interface element identifies detections of the features in data captured for a geographic area. The data may be sensor captured images selected from third-party stores consistent with the defined parameters. The timeline graphical user interface element may be segmented into multiple display elements consistent with the defined parameters.

System Environment

FIG. 1 shows an identification system 100 for identifying one or more sensor captured images recorded by third-parties which include information of interest (i.e., features, objects, or conditions) of interest to a user. The analytics system includes a client computing device 110, an application server 130, and a sensor captured image database 140. As will be described below, parameters recorded at the client device are received by the application server 130, which in turn may search the sensor captured image database 140 for sensor captured images which meet the specified parameters and analyze any identified images. Although FIG. 1 illustrates only a single instance of most of the components of the identification system 100, in practice more than one of each component may be present, and additional or fewer components may be used.

A client device 110, at the behest of a user or other computer system (not shown), interacts with the identification system 100 via the network 150. The client device 110 is a computer system. An example physical implementation is described more completely below with respect to FIG. 2. The client device 110 is configured to communicate with the application server 130 via network 150. With network 150 access, the client device 110 transmits, to the application server 130, a set of parameters and instructions for performing a search of the sensor captured image database 140 and performing an analysis on a set of images accessed from the database 140. More specifically, the client device comprises an application interface 120 which allows a user to interact with, customize, or adjust parameters used to perform the search of the sensor captured image database 140 or the analysis of accessed sensor captured images. The application interface 120 is further described with reference to FIGS. 3-10. In one embodiment, the web browser 125 enables a user to perform searches for relevant content or useful insights to further refine or adjust search parameters over the network 150. Although the web browser 125 may be used to display the application interface 120, in other embodiments the application interface 120 may be presented by a non-web browser based interface, such as a mobile application, desktop application, command line interface, and so on.

Figure 2:
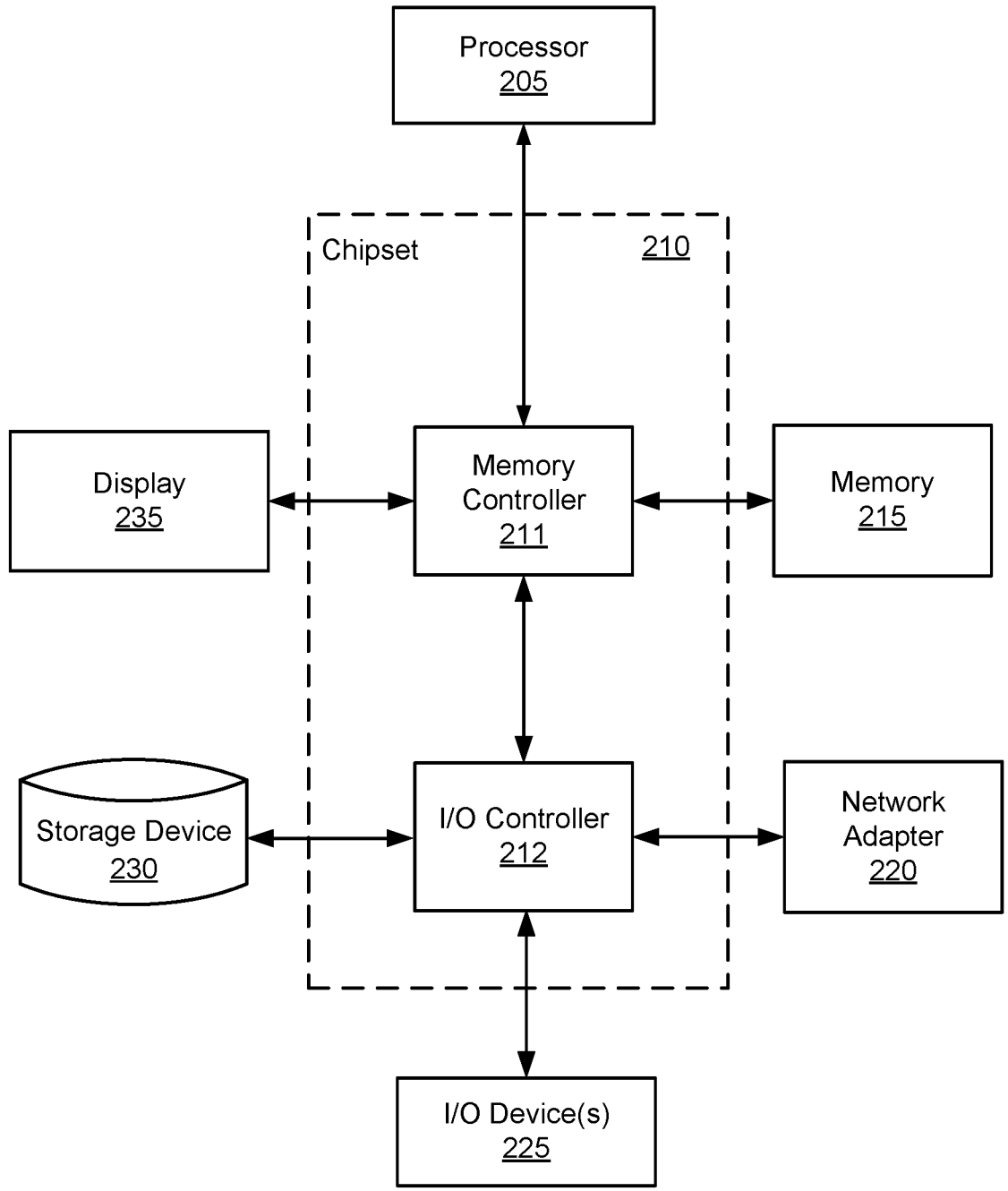
FIG. 2 is a high-level block diagram illustrating physical components of an example computer that may be used as part of a client device, application server, and/or database server from FIG. 1, according to one embodiment.

The application server 130 is a computer or network of computers. Although a simplified example is illustrated in FIG. 2, typically the application server will be a server class system that uses powerful processors, large memory, and faster network components compared to a typical computing system used, for example, as a client device 110. The server typically has large secondary storage, for example, using a RAID (redundant array of independent disks) array and/or by establishing a relationship with an independent content delivery network (CDN) contracted to store, exchange and transmit data such as the asthma notifications contemplated above. Additionally, the computing system includes an operating system, for example, a UNIX operating system, LINUX operating system, or a WINDOWS operating system. The operating system manages the hardware and software resources of the application server 130 and also provides various services, for example, process management, input/output of data, management of peripheral devices, and so on. The operating system provides various functions for managing files stored on a device, for example, creating a new file, moving or copying files, transferring files to a remote system, and so on. The application server 130 includes a software architecture for supporting access and use analytics system 100 by many different client devices 110 through network 150, and thus at a high level can be generally characterized as a cloud-based system.

Generally, the application server 130 is designed to handle a wide variety of data. The application server 130 includes logical routines that perform a variety of functions including checking the validity of the incoming data, parsing and formatting the data if necessary, passing the processed data to a database server 140 for storage, and confirming that the database server 140 has been updated. The application server 130 hosts a feature identification module 131 which receives search parameters or other conditions from a client device requesting a specific subset of sensor captured images. The feature identification module 131 accesses content stored within the sensor captured image database 140 based on the parameters and analyzes the accessed images to present to a user images which may be most relevant to their search. The application server 130 communicates, via the network 150, the relevant sensor captured images to the client device 110 for presentation to a user via the application interface 120.

Consist with the description above related to the application server 130, the sensor captured image database 140 may be a server which hosts a repository of sensor captured images recorded by third-party entities. Sensor captured images may be recorded by overhead or aerial imaging devices such as satellites, airplanes, drones, and other devices capable of capturing images, such as ground based vehicles, cameras, and so on. Some third-parties may record approximately 300 sensor captured images daily, whereas others may record up to 1000 images daily. Although illustrated in FIG. 1 as a single database 140, each third-party entity may store images recorded by their own satellites (or other devices) in separate databases. In such implementations, the feature identification system may access and communicate with a plurality of databases stored on different servers via the network 150.

The network 150 represents the various wired and wireless communication pathways between the client device 110, the application server 130, and the sensor captured image database 140. Network 150 uses standard Internet communications technologies and/or protocols. Thus, the network 150 can include links using technologies such as Ethernet, IEEE 802.11, Bluetooth, asynchronous transfer mode (ATM), etc. Similarly, the networking protocols used on the network 150 can include the transmission control protocol/Internet protocol (TCP/IP), the hypertext transport protocol (HTTP), the simple mail transfer protocol (SMTP), the file transfer protocol (FTP), etc. The data exchanged over the network 150 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Example Computing Device

FIG. 2 is a high-level block diagram illustrating physical components of an example computer 200 that may be used as part of a client device 110, application server 130, and/or database server 140 from FIG. 1, according to one embodiment. Illustrated is a chipset 210 coupled to at least one processor 205. Coupled to the chipset 210 is volatile memory 215, a network adapter 220, an input/output (I/O) device(s) 225, a storage device 230 representing a non-volatile memory, and a display 235. In one embodiment, the functionality of the chipset 210 is provided by a memory controller 211 and an I/O controller 212. In another embodiment, the memory 215 is coupled directly to the processor 205 instead of the chipset 210. In some embodiments, memory 215 includes high-speed random access memory (RAM), such as DRAM, SRAM, DDR RAM or other random access solid state memory devices.

The storage device 230 is any non-transitory computer-readable storage medium, such as a hard drive, compact disk read-only memory (CD-ROM), DVD, or a solid-state memory device. The memory 215 holds instructions and data used by the processor 205. The I/O device 225 may be a touch input surface (capacitive or otherwise), a mouse, track ball, or other type of pointing device, a keyboard, or another form of input device. The display 235 displays images and other information from for the computer 200. The network adapter 220 couples the computer 200 to the network 150.

As is known in the art, a computer 200 can have different and/or other components than those shown in FIG. 2. In addition, the computer 200 can lack certain illustrated components. In one embodiment, a computer 200 acting as server 140 may lack a dedicated I/O device 225, and/or display 218. Moreover, the storage device 230 can be local and/or remote from the computer 200 (such as embodied within a storage area network (SAN)), and, in one embodiment, the storage device 230 is not a CD-ROM device or a DVD device.

Generally, the exact physical components used in a client device 110 will vary in size, power requirements, and performance from those used in the application server 130 and the database server 140. For example, client devices 110, which will often be home computers, tablet computers, laptop computers, or smart phones, will include relatively small storage capacities and processing power, but will include input devices and displays. These components are suitable for user input of data and receipt, display, and interaction with notifications provided by the application server 130. In contrast, the application server 130 may include many physically separate, locally networked computers each having a significant amount of processing power for carrying out the asthma risk analyses introduced above. In one embodiment, the processing power of the application server 130 provided by a service such as Amazon Web Services™ Also, in contrast, the database server 140 may include many, physically separate computers each having a significant amount of persistent storage capacity for storing the data associated with the application server.

As is known in the art, the computer 200 is adapted to execute computer program modules for providing functionality described herein. A module can be implemented in hardware, firmware, and/or software. In one embodiment, program modules are stored on the storage device 230, loaded into the memory 215, and executed by the processor 205.

Feature Detection User Interface Display Overview

The application interface 120, also referred to as a feature detection user interface display, graphically presents a variety of information to a user using interactive graphical user interface elements. By interacting with one or more graphical user interface elements a user may customize a set of conditions, also referred to as search parameters, to characterize a set of sensor captured images in which the user is interested. The following section describes a number of possible graphical user interface elements in conjunction with the example display elements illustrated in FIG. 5.

Interaction with graphical elements may occur in a variety of ways. For example, interface display may provide information in response to receiving user interaction (e.g., a selection) from a user through an associated client device 110. There are a wide variety of ways the system may receive user input, examples of which include but are not limited to: hovering over a graphical element with a pointer device or finger, holding a graphical element for a length of time, touching or clicking a graphical element one or more times. Additionally, graphical elements presented on a client device 110 may be changed in response to some constituent piece of information of the dashboard is able to present changes. The application interface 120 may dynamically update or display graphical user interface elements to a user via a client device 110 in response to one or more computer readable instructions transmitted by the feature detection module 131, or more generally the application server 130.

In some embodiments, the application interface 120 may generate multiple graphical user interface elements to be presented simultaneously to a user. The layout or presentation of such interface elements may be customized based on the size and technical constraints of a display on a client device. In particular, the layout of a graphical user interface elements for a client device with a smaller display (e.g., a cell phone or hand-held device) may be configured differently from a client device with a larger display. For example, the graphical elements presented via the smaller display may overlay each other or organized behind additional interactive interface elements. In comparison, devices with larger displays may be present graphical elements simultaneously and adjacent to each other without overlaying the elements or hiding the elements behind additional interactive elements.

Responsive to being opened on a client device, the application interface 120 may generate a homepage interface including a navigation menu with various interactive elements. These may include a menu (e.g., a drop-down menu) or an alternate form of a record of previous projects which a user has defined, previously sent instructions for the feature identification module to perform, or both. Each project may be illustrated as an interactive interface element such that in response to a use input with the element, the application interface 120 generates a graphic user interface element describing the search parameters assigned to the project, the results associated with the project, or a combination thereof. In some embodiments of the home page, each project may be associated with an interactive element allowing users to review, edit, or delete details of the project. The homepage may additionally include an interactive element, for example a "New Project" button, which allows users to design new searches for a new feature or set of features, for a new location, for a new set of search parameters, or a combination thereof.

Search Parameter User Interface

Responsive to the selection of a "New Project" interactive element, the application interface 120 generates a search parameter interface to be displayed to a user via the client device 110. In one embodiment, the search parameter interface is presented on a display of the client device in place of the previously displayed homepage interface. In another embodiment, the search parameter interface is presented on the display by overlaying graphical user interface elements of the homepage interface with graphical user interface elements of the search parameter.

Figure 3:
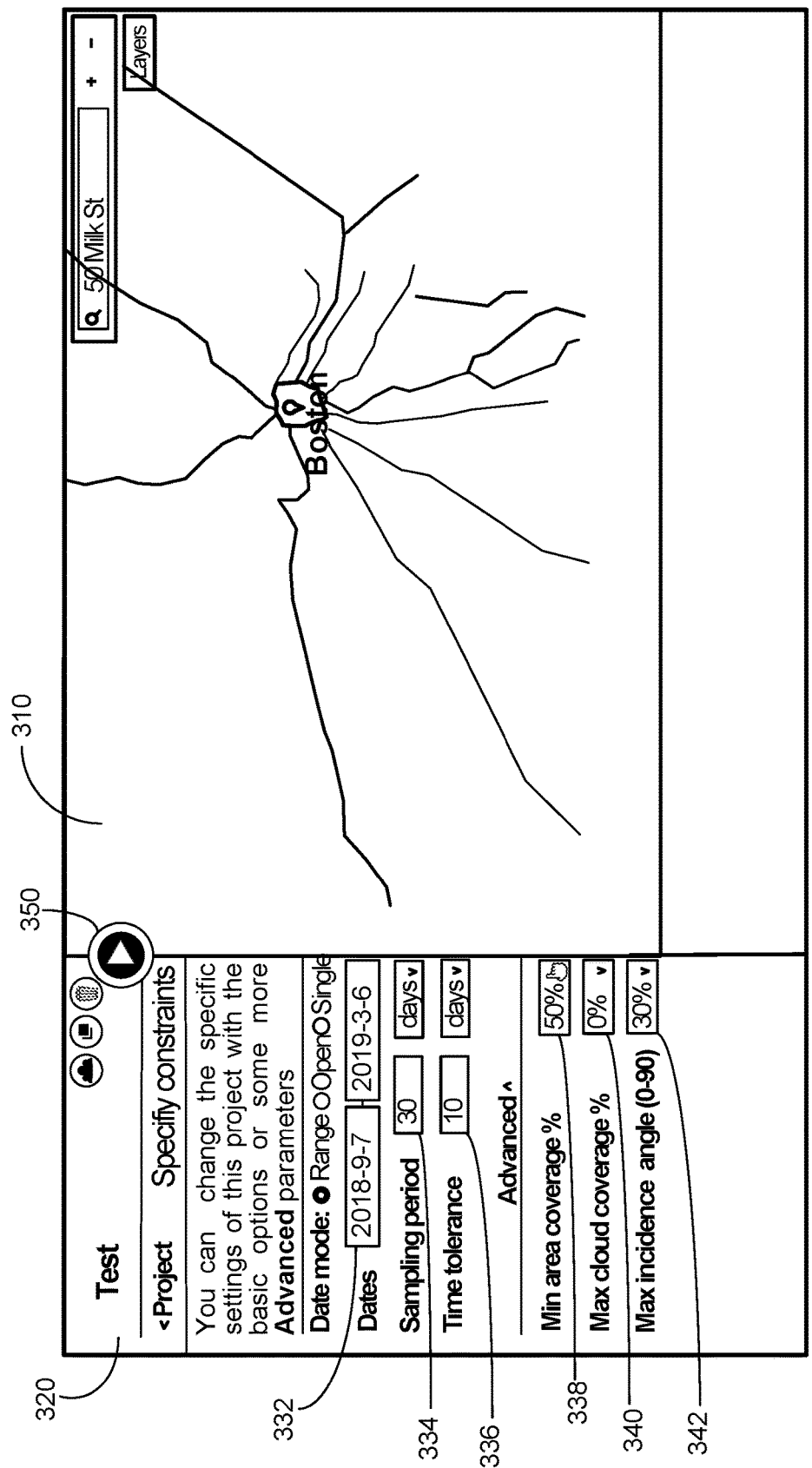
FIG. 3 illustrates graphical user interface elements of an exemplary search parameter interface, according to one embodiment.

FIG. 3 illustrates graphical user interface elements of an exemplary search parameter interface, according to one embodiment. The interface illustrated in FIG. 3 includes a first graphical user interface element illustrating a map of a geographic area, referred to hereafter as a geographic spatial graphical user interface element 310. In some embodiments, the geographic area may identify an area of interest specified by a user via the client device. In implementations in which the user has specified a geographic area of interest before defining one or more search parameters, the geographic spatial graphical user interface element 310 displays a specific location or region. For example, in the illustrated embodiment, the geographic spatial graphical user interface outlines a region surrounding Boston. In other embodiments in which the user has not yet specified a geographic area of interest, the geographic spatial graphical user interface 310 may be blank or display a portion of a map without designating a specific location or region of interest. The geographic spatial graphical user interface element 310 is further described with reference to FIGS. 4 and 5.

Additionally, the search parameter interface 300 includes a graphical user interface element which allows a user to define a set of search parameters for a project. As described herein such an interface element is referred to as a search parameter graphical user interface element 312. Each search parameter presented on the interface element 312 is associated with a data entry user interface element. By interacting with such data entry user interface elements, a user is able to define values for or select an option for each search parameter. In the illustrated embodiment of FIG. 3, the search parameters presented via the search parameter graphical user interface 320 include a time range, a sampling period, a time tolerance, a minimum area of coverage reading, a maximum cloud coverage reading, and a maximum incidence angle reading. Although the illustrated embodiment shows that a user may enter these search parameters, in other embodiments the search parameters may be entered, or partially entered, by a separate computer system.

The time range indicates a duration of time within which accessed sensor captured images of a geographic region are captured. For example, in the illustrated embodiment of FIG. 3, the time range has been defined as Sep. 7, 2018-Mar. 6, 2019. Accordingly, the feature identification module 131 may access the sensor captured image database to search for sensor captured images recorded between Sep. 19, 2018 and Mar. 6, 2019. To specify a type (also referred to as a "mode") of time range, a user may interact with several time type selector user interface elements of the search parameter graphical user interface element 320. In one embodiment, the search parameter interface element 320 includes a set of time type selector user interface elements 332 including a closed time range including a start time and an end time, an open-ended time range including a start time, and a single time. In response to a user selecting one of the selector elements 332 designing one of the above date types, the application interface 120 may dynamically update the search parameter interface to include a second layer of selector elements 332 specifying any necessary boundaries of the time range.

In the embodiment illustrated in FIG. 3, user input has selected the time type selector element 332 designating a time type as a range of dates. Accordingly, the interface element 320 has updated to include additional selectable elements 332 for defining a start time and an end time. In one embodiment, the start time and end time may be defined in response to a typographical input from a user. In another embodiment, the start time and end time may be selected from a set of available dates, for example a calendar display. Inputs to the start time and end time may vary in levels of granularity. Inputs at high levels of granularity may include a date including a day, month, year, and time, whereas inputs at low levels of granularity may include a date with a month or year. In embodiments (not shown) in which user input selects the time type selector element 332 specifying an open-ended range, the interface element 320 may be updated to include an additional selectable element 332 for defining only a start time or only an end time. In another embodiment (not shown) in which a user input selects the time type selector element 332 specifying a single time, the interface element 320 may be updated to include an addition selectable element 332 for defining the date. Although functionally different, the search parameter interface 320 of the latter two embodiments may be graphically similar.

A sampling period indicates a frequency at which sensor captured images are accessed within the time range. The sampling period may further be characterized by specific sampling dates within that frequency. For example, in the illustrated embodiment of FIG. 3, the sampling frequency has been defined at 30 days. Accordingly, the feature identification module 131 may further periodically access images from the sensor captured image database 140 recorded within 30-day intervals. To specify a sampling period, a user may interact with sampling selector user interface elements of search parameter graphical user interface element 320. In one embodiment, the search parameter interface element 320 includes a set of sampling period selector user interface elements 334. The sampling period selector user interface elements 334 allow a user to specify a numerical value and a frequency unit. In one embodiment, either or both the numerical value and the frequency unit may be defined in response to a typographical input from a user, from a set of selectable values, or a combination thereof. In the illustrated embodiment of FIG. 3, the selector user interface elements 334 includes a first selector element 334 by which a user typographically specifies a numerical value and a second selector element 334 by which a user selects from a frequency unit from a drop-down menu. The drop-down menu may additionally offer alternate units, for example weeks or months. Depending on the level of granularity that the user is interested in, the sampling period may be adjusted accordingly. The sampling period allows the user to control an amount of imagery utilized, thus controlling the amount of resources (e.g., costs) needed to acquire the imagery. This also controls the amount of data received, which may be significant when considering a large geographic area. In some cases, not all images of a geographic area are needed, and only a subset defined by the sampling period are necessary in order to limit the amount of data received and the amount of data to analyze.

A time tolerance indicates an interval of time by which dates on either end of the sampling period may be extended. For example, in the illustrated embodiment of FIG. 3, the time tolerance has been defined at 10 days. Accordingly, the feature identification module 131 may access sensor captured images stored within the sensor captured image database 140 that are captured either 10 days before or after the sampling period date. The sampling period dates are the dates which fall at the end of each sampling period, starting from the start time. Thus, if the sampling period were defined as 30 days, and the time tolerance as 10 days, a first sampling period date may be set at 30 days from the start date, with the time tolerance indicating a range from 20 days to 40 days. A second sampling period date would be at 60 days, with the time tolerance specifying a range from 50 days to 70 days. Note that although a date is referred to herein, the sampling period and any dates may be specified in different time values, such as seconds, minutes, hours, weeks, months, years, or other time defined values. Similar to the sampling selector user interface elements 334, a user may interact with tolerance selector user interface elements 336 of search parameter graphical user interface element 320. In one embodiment, the tolerance selector user interface elements 336 allow a user to specify a numerical value and a frequency unit. The description of the functionality and graphics of the sampling period selector user interface elements 334 also describes the tolerance selector user interface elements 336. The selector may be a text value entry selection widget, a slider, a pull-down, or other forms of value entries means.

A minimum area of coverage reading indicates a threshold level of area covered by a sensor captured image of the geographic region for the sensor captured image to be considered by the feature identification module 131. For example, in the illustrated embodiment of FIG. 3, the minimum area of coverage reading has been defined at 50%. Accordingly, any images stored within the sensor captured image database 140 which do not capture at least 50% of a defined geographic area (or other default capture percentage) are removed from consideration by the feature identification module 131 even if those images were captured within the defined time range and sampling period. In one embodiment, a user may specify a minimum area of coverage by using an area coverage selector user interface element 338. The coverage selector user interface element allows a user to specify a numerical value by either a typographical input or by a selection from a set of selectable values, for example a drop-down menu.

Cloud coverage (or other image interference that may not cause full imaging of the captured region within the image) describes the amount of a sensor captured image obscured by clouds. A higher level of cloud coverage may result in less visibility of the features captured in an image or less visibility of a geographic area captured in an image in general. Accordingly, a maximum cloud coverage reading indicate a threshold level of cloud coverage over a geographic area captured in a sensor captured image. Sensor captured images with cloud coverage greater than the minimum threshold are removed from consideration by the feature identification module 131. The functional and graphical description above the area coverage selector user interface element 338 also applies to a cloud coverage selector user interface element 440 by which a user may define the maximum cloud coverage.

For sensor captured images captured by an aerial sensor moving over a geographic area, the sensor may be associated with an incidence angle describing the position of the sensor relative to a geographic area. Images captured when a sensor is positioned directly above (or perpendicular to) a geographic area may be the least distorted and considered to be of the highest analytical value. These images have an incidence angle of zero. As the sensor moves past the perpendicular point, the images captured of that geographic area may be distorted or subject to factors which reduce the analytical value of an image. These images have an incidence angle greater than zero. The incidence angle is computed as the angle of an imaginary line with the ground, where the imaginary line passes through the sensor and the geographic area of interest. Accordingly, a maximum incidence angle of a sensor captured image of the geographic area indicates a threshold position of a sensor relative to a geographic area. Sensor captured images captured by sensors positioned beyond the threshold incidence angle for a geographic region are removed from consideration by the feature identification module 131. The functional and graphical description above the area coverage selector user interface element 338 also applies to an incidence angle selector user interface element 342 by which a user may define the maximum angle of incidence.

In some embodiments, one or more search parameters may not be specified. In one such embodiment, the feature identification module 131 may search the sensor captured image database 140 without bearing consideration to the unspecified search parameter. In another embodiment, the unspecified search parameter may be automatically set to a default value before the feature identification module 131 searches the sensor captured image database 140. The default value may be previously defined by a user or by a distributor of the system. In another embodiment, the application interface 120 may present an error message or notification indicating that a search parameter has not been specified.

In response to defining a set of search parameters, a user may specify select or interact with a search execution user interface element 350. In response to selection of the search execution user interface element 350, the application server receives a set of communications instructing the feature identification module 131 to search of the sensor captured image database 140 for images consistent with the specified search parameters.

Feature Selection User in Interface

In addition to the search parameters described with reference to FIG. 3, a user may also specify one or more features of interest to identify in a sensor captured image. For a sensor captured image to be selected or considered by the feature identification module 131, the sensor captured image should capture the defined feature to some degree that is detectable by the feature identification module 131.

In some embodiments, responsive to the selection of a "New Project" interactive element, the application interface 120 generates a feature selection interface to be displayed to a user via the client device 110. In one embodiment, the feature selection user interface is presented on the display by overlaying graphical user interface elements of the homepage interface with graphical user interface elements of the feature selection interface. In alternate embodiments, the feature selection user interface may be accessed from a search parameter interface, for example search parameter interface 300 via a navigation option (not shown). In such embodiments, the feature selection user interface may be presented on the display by overlaying or, alternatively, replacing graphical user interface elements of the search parameter interface with graphical user interface elements of feature selection user interface.

Figure 4A:
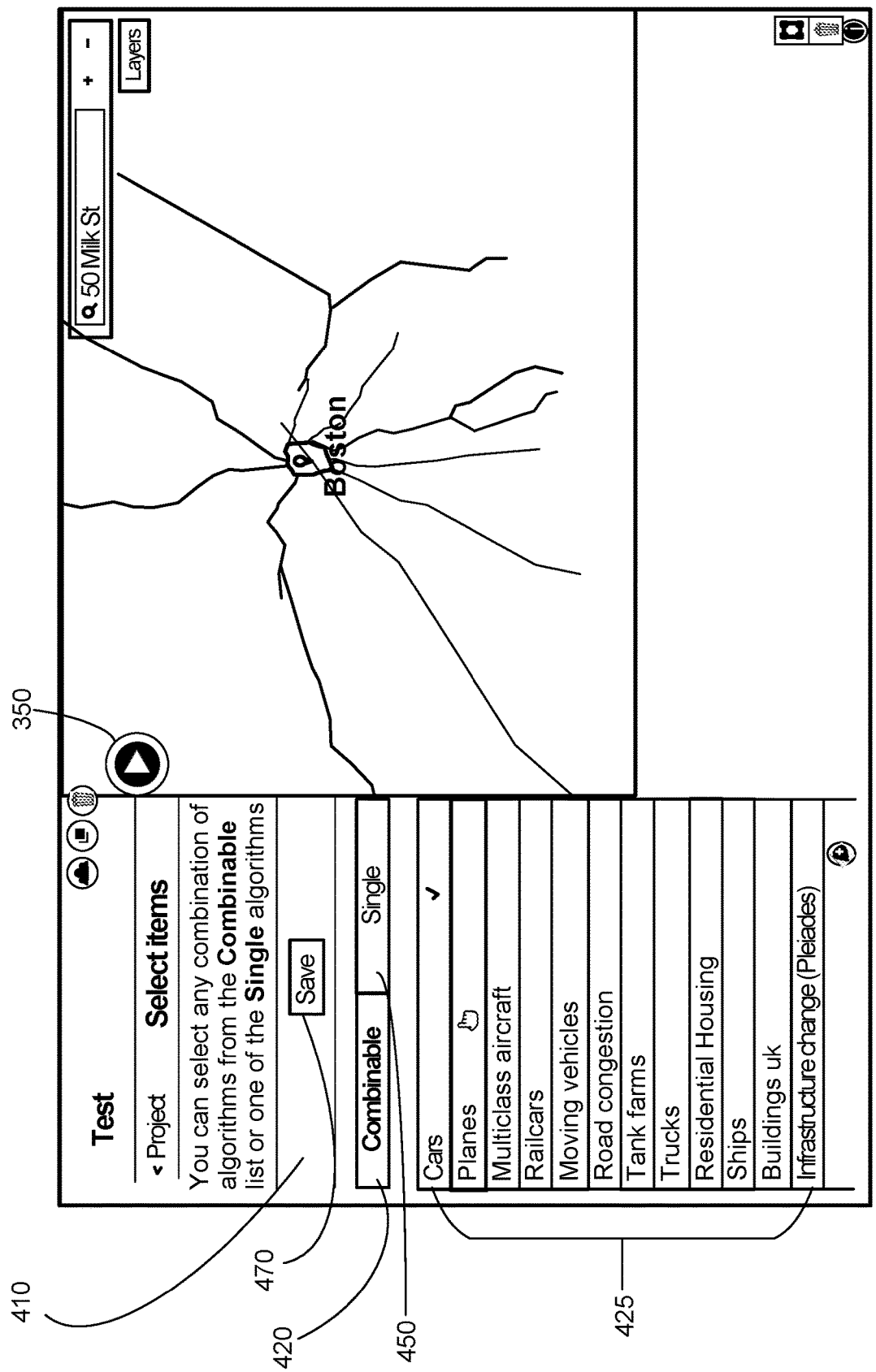
FIG. 4A illustrates graphical user interface elements for selecting a combination of features from a feature selection interface, according to one embodiment.

FIG. 4A illustrates graphical user interface elements for selecting a combination of features from a feature selection interface, according to one embodiment. The interface illustrated in FIG. 4 includes a first graphical user interface element illustrating a set of stored candidate features, hereafter referred to as a candidate features graphical user interface element 410. As described herein, "features" refer to observable elements in a geographic area which may be detected or measured based on data (e.g., image data) captured by a sensor. Examples of features include, but are not limited to, parked cars, aircraft, railcars, moving vehicles, tank farms, trucks, residential housing, ships, or buildings in a geographic area. Features may also refer to concepts which are data observed over time, for example road congestion, infrastructure changes, foot traffic, land use aggregation, or land use changes. In some embodiments, the candidate features graphical user interface element 410 comprises a set of selectable interface elements identifying candidate features for detection. In one embodiment, the candidate features graphical user interface elements 410 includes a combo feature selectable interface element 420 allowing a user to identify a feature or a combination of features in a single or multiple captured images. In response to the selection of the combo feature selectable interface element 420, the application server 130 may transmit one more computer readable instructions to the client device to display a second set of candidate list selectable interface element 425 listing the candidate features. The list of candidate features included in the candidate list selectable interface element 425 as illustrated in FIG. 4 is intended to be illustrative, but not limiting as to the scope of candidate features which may be selected.

Figure 4B:
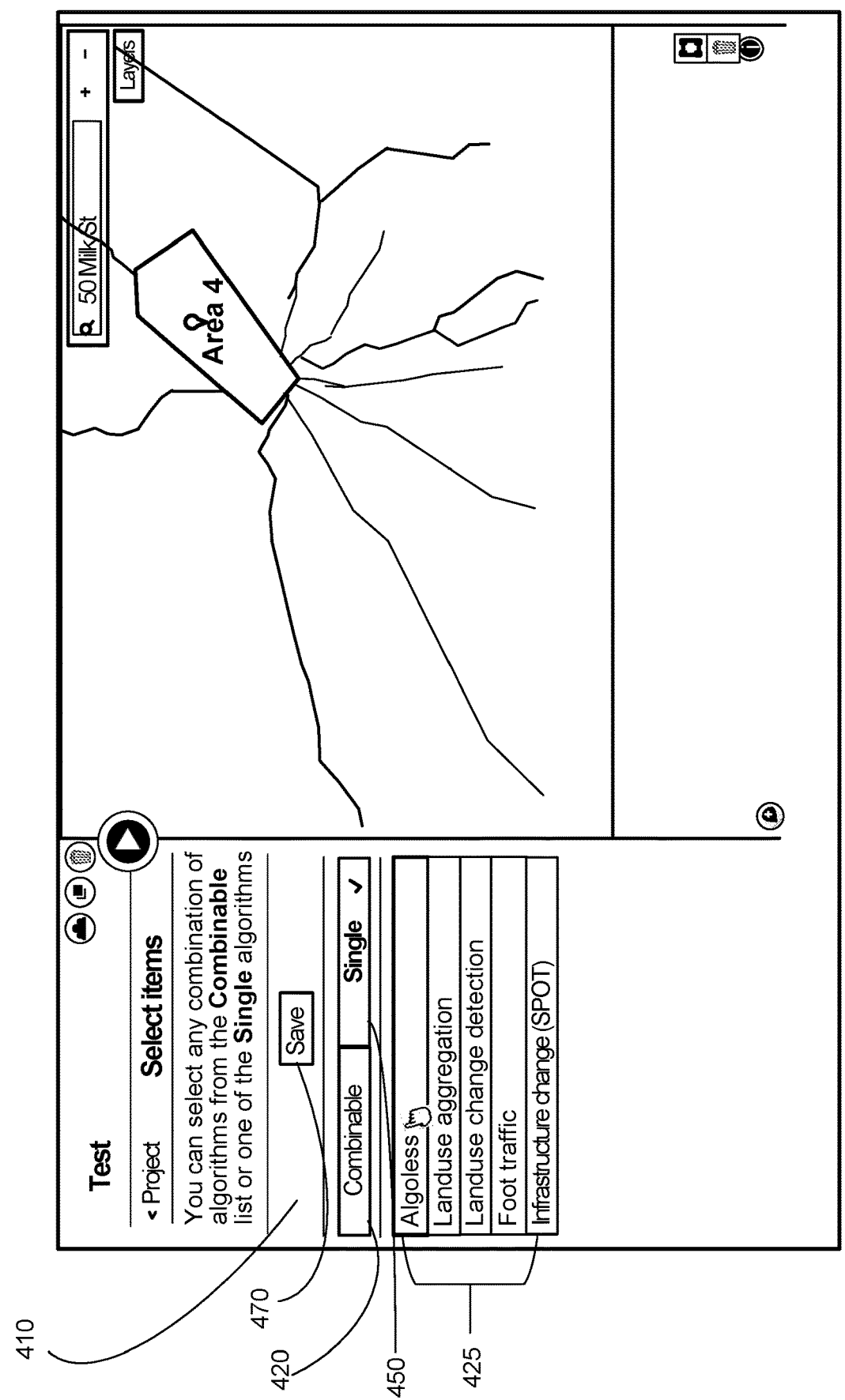
FIG. 4B illustrates graphical user interface elements for selecting a single feature from a feature selection interface, according to one embodiment.

FIG. 4B illustrates graphical user interface elements for selecting a single feature from a feature selection interface, according to one embodiment. Whereas FIG. 4A illustrates a feature selection user interface 400 in which a combo feature selectable interface element 420 has been selected to specify a combination of candidate features, FIG. 4B illustrates a feature selection user interface 400 in which a single feature selectable interface element 450 has been selected to specify a single candidate features. The description of the functionality and graphic elements as described with reference to FIG. 4A also applies to the description of the candidate features graphical user interface 410.

In addition to the candidate features included in the combo feature selectable interface elements 425, the candidate features graphical user interface element may include an option (e.g., a navigation option) allowing a user to identify a new feature of interest. Responsive to user inputs with a record selectable interface element 470 which saves the feature, the list of candidate features (i.e., candidate list selectable interface elements 425) may be updated to include the newly specified feature. The presentation of the selectable features may be based on a preset listing, an image processing determining of features accessible in an image data set, a set of features from a previous search or other means to provide a feature selection.

Upon selection of the combo feature selectable interface element 420 a user may select multiple candidate features from the candidate list selectable element 425. Alternatively, upon selection of the selectable interface element 450, a user may select a single candidate feature from candidate list selectable element 425. In response to the selection of one or more candidate features, a user may select the search execution user interface element 350 which transmits a set of instructions to the feature identification module 131 to search the sensor captured image database 140 for images including the candidate feature(s). When searching sensor captured image database 140, the feature identification module 131 may implement one or more image processing algorithms specific to the selected candidate features to analyze sensor captured images stored in the sensor captured image database 140. Image processing algorithms may be uploaded to the application server, or more specifically the feature identification module 131, by a user of the system as needed during their use of the system. Alternatively, a set of algorithms may be uploaded to the feature identification module 131 as a set of default algorithms.

Geographic Area User Interface

In addition to the search parameters described with reference to FIG. 3 and the selected features described with reference to FIG. 4, a user may also define a geographic region of interest to be identified in a sensor captured image. For a sensor captured image to be selected or considered by the feature identification module 131, the sensor captured image should capture at least a portion of the geographic region of interest. In particular, to be considered by the feature identification module 131, a sensor captured image must capture a portion of the geographic region of interest greater than the minimum area of coverage as defined using the area coverage selector user interface element 338.

In some embodiments, responsive to the selection of a "New Project" interactive element, the application interface 120 generates a feature selection interface to be displayed to a user via the client device 110. In one embodiment, the geographic area user interface is presented on the display by overlaying graphical user interface elements of the homepage interface with graphical user interface elements of the geographic area user interface. In alternate embodiments, the geographic area interface may be accessed from a search parameter interface, for example search parameter interface 300 via a navigation option (not shown). In such embodiments, the feature selection user interface may be presented on the display by overlaying or, alternatively, replacing graphical user interface elements of the search parameter interface with graphical user interface elements of the geographic area user interface.

Figure 5:
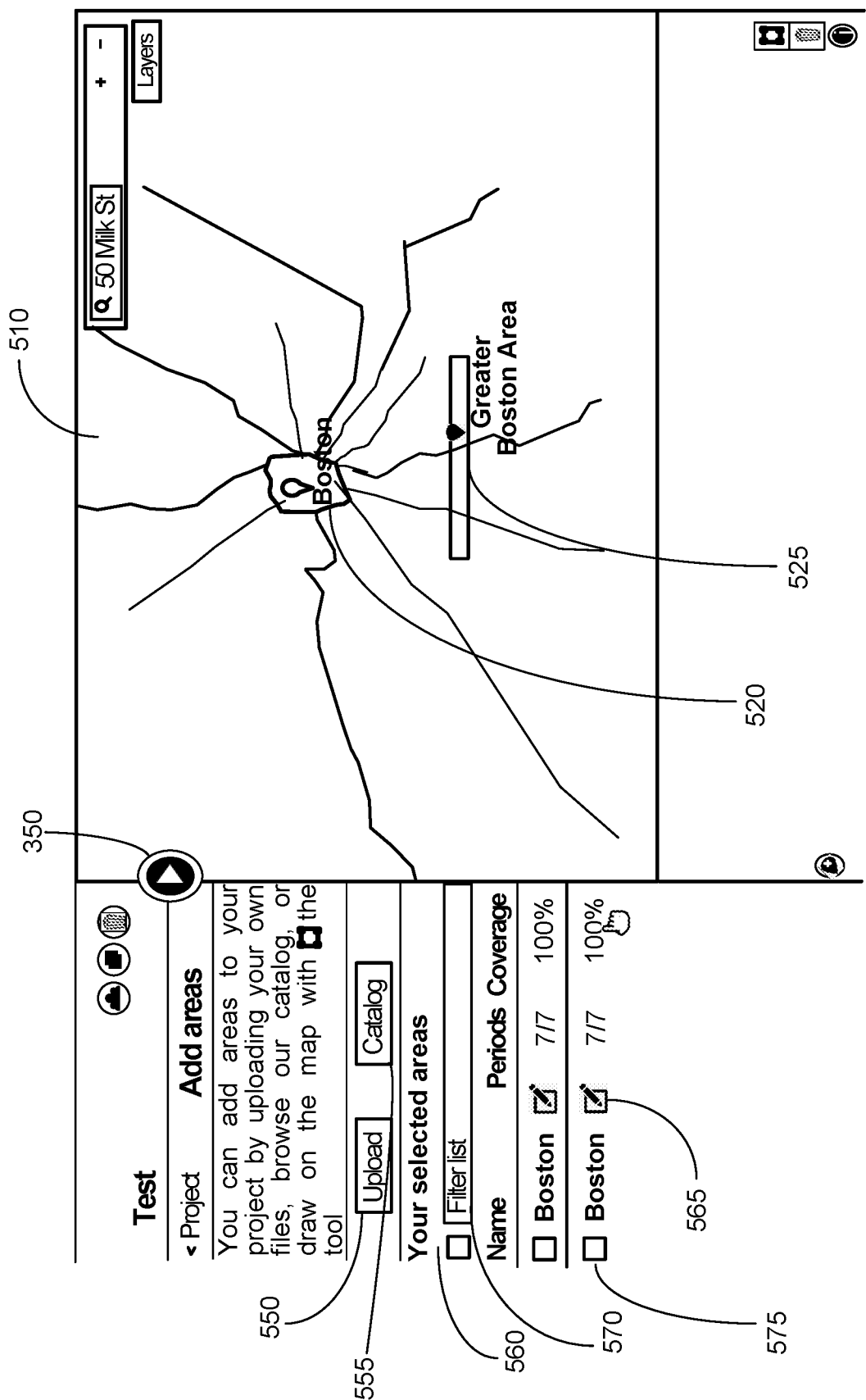
FIG. 5 illustrates graphical user interface elements for defining a geographic area based on user input to a geographic area interface, according to one embodiment.

FIG. 5 illustrates graphical user interface elements for defining a geographic area based on user input to a geographic area interface, according to one embodiment. The interface illustrated in FIG. 5 includes a first graphical user interface element illustrating an outline of the defined geographic area on a map, hereafter referred to as a geographic spatial graphical user interface element 510, and a second graphical user interface element allowing a user to define the geographic area, hereafter referred to as an area selection graphical user interface element 560.

A user may define a geographic area through several options included in the geographic area user interface. In one embodiment, a user may outline the boundaries of a region directly onto the geographic spatial graphical user interface element 510 using tactile input to draw the outline on a display of the client device 110, for example by a finger, stylus, or the movement of a mouse. In some embodiments, the outline may be drawn based on a continuous movement of over the graphics display. For example, a user may trace the boundaries of a geographic region using a single, continuous input over the entire boundary. In the illustrated embodiment of FIG. 5, the Boston regional outline 520 may be defined in such a manner. In another embodiment, a user may define a set of points, for example representing corners or vertices of a boundary of a geographic region and the application server 130 transmits instructions for the application interface 120 dynamically updates the geographic spatial graphical user interface element 510 to define the outline of a region based on the corners/vertices. In the illustrated embodiment of FIG. 5, the Greater Boston area regional outline 525 may be defined in such a manner.

After a user defines a geographic area using one of the techniques described above, the defined geographic area is automatically included in the area selection graphical user interface element 560. A user may edit a selection using the selectable user interface 565 to update the label or details associated with the defined geographic area. In response to the selection of the edit selectable interface element 565, the application interface 120 may receive instructions to dynamically present an area information graphical user interface element (not shown) through which a user may list a title and any relevant details regarding the area. Alternatively, input to the selection of the upload selectable interface element 550 may allow a user to upload a file downloaded to the client device 110 via the web browser 125 (or an alternate connection to the internet) which defines a geographic area. In some embodiments, the file is an image file which the feature identification module 131 processes to extract boundaries of a geographic region.

In yet another embodiment, a user may access a stored catalog of geographic areas based on input to the area catalog selectable interface element 555. The stored catalog of geographic areas may include a default set of geographic areas generated before the user accesses the system, a set of geographic areas previously defined by the user, or a combination thereof. In response to the selection of the catalog selectable interface element 555, the application interface 120 may receive instructions to dynamically present a catalog graphical user interface element (not shown) through which a user may browse for a geographic area using scrollable selectable elements, searchable selectable elements, or a combination thereof. The catalog of geographic areas may include geographic areas at varying levels of granularity, for example ranging from outlines of individual states to outlines of individual neighborhoods within states.

In the illustrated embodiment of FIG. 5, the area selection graphical user interface element 560 is presented adjacent to the to the geographic spatial graphical user interface element 510. However, in other embodiments, the area selection graphical user interface element 560 may overlay the map interface element 510 or be minimized, maximized, or repositioned relative to the map interface element in response to user input. In response to a selection of a geographic area from the catalog of geographic areas, a definition of a geographic area on the geographic spatial graphical user interface 510, or a combination thereof, the area selection graphical user interface element 560 presents the selected geographic areas as a list. The embodiment of the area selection interface element 560 illustrated in FIG. 5 displays two Boston areas, one of which refers to the user-drawn outline of Boston and one of which refers to the outline of the Greater Boston Area. The area selection graphical user interface element 560 also includes a filter searchable element 570 through which a user may search for a specific geographic area from the list. To select or de-select, a geographic area listed in the area selection interface element 560, a user may interact with a selectable element 575 to identify specific boundaries of geographic areas to be displayed on the geographic spatial graphical user interface element 510. In some embodiments, a user may be interested in editing or updating the boundaries of a geographic area after initially selecting the area from the catalog or defining the area on the map interface 510. Accordingly, a user may select the edit selectable user interface element 565 to edit the boundary of the geographic area directly on the geographic spatial graphical user interface element 510.

In response to the selection of one or more geographic areas, a user may select the search execution user interface element 350 which transmits a set of instructions to the feature identification module 131 to search the sensor captured image database 140 for images capturing a threshold fraction of the geographic area. When searching sensor captured image database 140, the feature identification module 131 may implement one or more image processing algorithms to analyze sensor captured images stored in the sensor captured image database 140.

Project Summary User Interface

Figure 6:
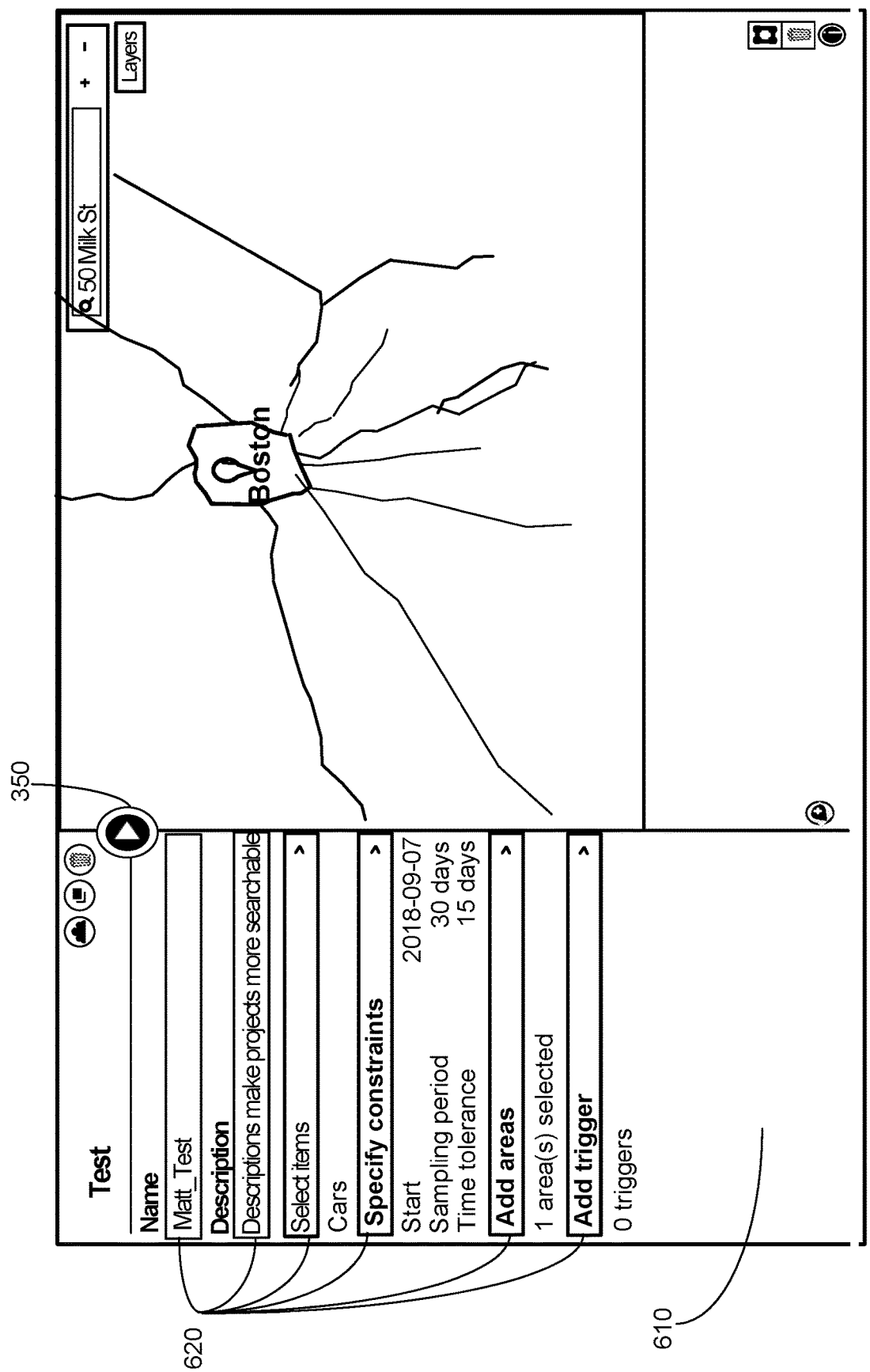
FIG. 6 illustrates graphical user interface elements displaying a summary of details for a project, according to one embodiment.

In response to user inputs specifying a set of search parameters, at least one geographic area of interest, and a feature of interest and selecting the search execution user interface element 350, the application interface 120 receives a set of instructions to generate a project summary interface. FIG. 6 illustrates graphical user interface elements displaying a summary of details for a project, according to one embodiment. The interface illustrated in FIG. 6 includes a parameter summary graphical user interface element 610 displayed adjacent to a geographic spatial graphical user interface 510 displaying an outline of the one or more geographic areas of interest. When transitioning from the geographic area interface (for example, as illustrated in FIG. 5) to the project summary interface (for example, as illustrated in FIG. 6), the application interface 120 may receive instructions to display the parameter summary graphical user interface element 610 overlaying or replacing the area selection graphical user interface element 560.

The parameter summary graphical user interface element 610 is segmented by parameter selectable interface elements 620. In the illustrated embodiment, the parameter selectable interface elements 620 including a project name, a project description, features of interest selected by the user (as described with reference to FIGS. 4A-B), a record of the specified parameters (as described with reference to FIG. 3), and a list of the geographic areas of interest (as described with reference to FIG. 5). Alternatively, the list of geographic areas may be a count of geographic areas rather than a list of names. A user may select each parameter selectable interface element 620 adjust or revise each of the previously specified parameters.

In one embodiment, a user may select the "add triggers" option as illustrated in FIG. 6. This allows the user to input one or more thresholds, which if reached, cause the system to perform additional actions, such as the notification of the user, the creation of a new project, and so on. The threshold may indicate a threshold for a count of individual objects matching the feature that are detected in the captured images.

In response to reviewing the contents of the parameter summary graphical user interface element 610 and confirming that the specified parameters are correct, a user may select the search execution user interface element 350 to confirm that the application client device transmits a set of instructions to the feature identification module 131 to search the sensor captured image database 140 for images capturing a threshold fraction of the geographic area and the feature of interest and consistent with the specified search parameters.

Results Display User Interface

Figure 7:
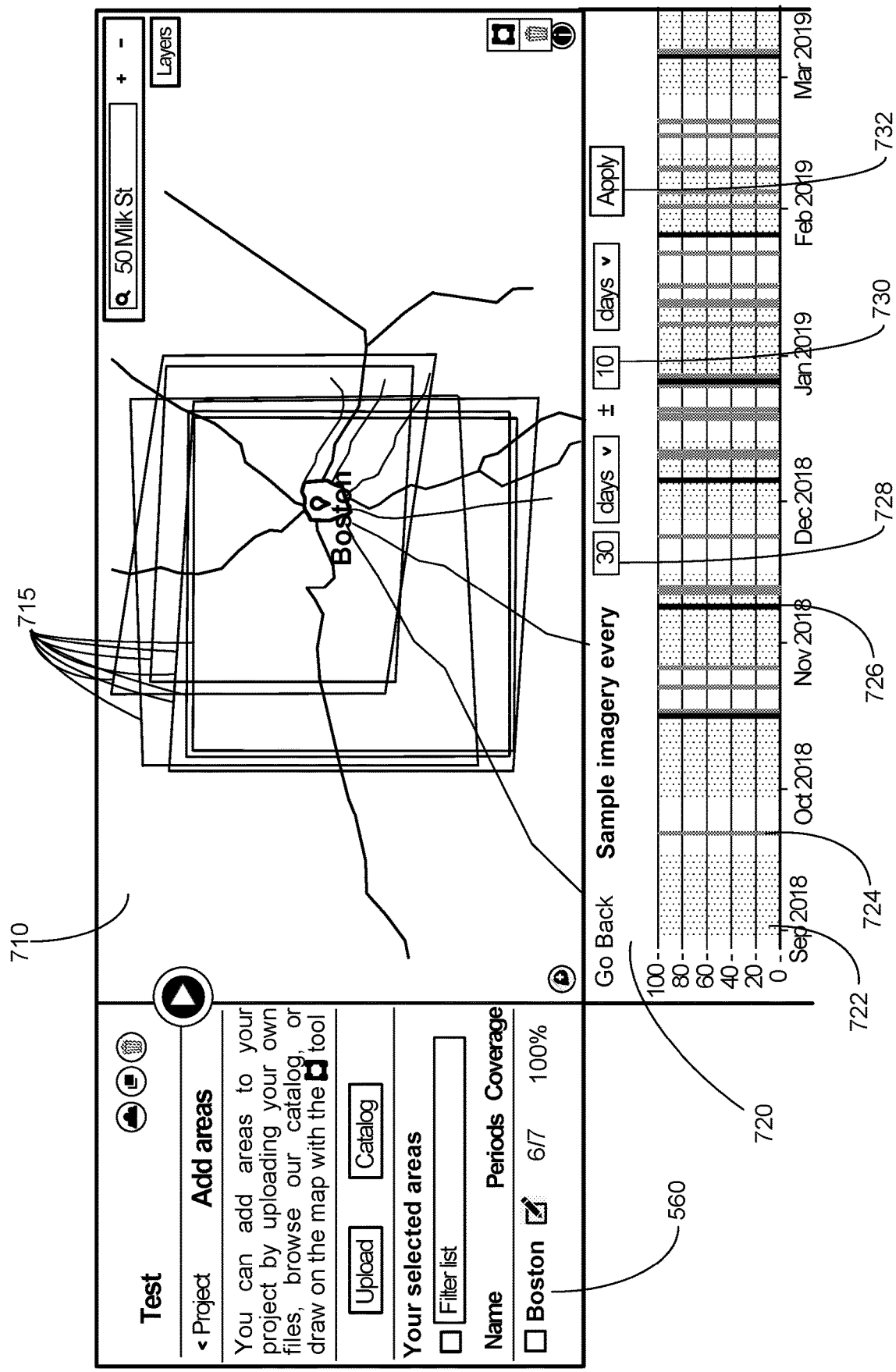
FIG. 7 illustrates graphical user interface elements displaying a results display interface, according to one embodiment.

After searching sensor captured image database 140 for sensor captured images matching the specified search parameters, the feature identification module 131, and more generally the application server 130, transmit one or more computer readable instructions for the client device to display a graphical user interface element describing the results of the search. As described herein, such an interface is referred to as a results graphical user interface element. FIG. 7 illustrates graphical user interface elements displaying a results display interface, according to one embodiment. The results display interface illustrated in FIG, 7 includes a geographic spatial graphical user interface element 710 and a timeline graphical user interface element 720.

During the search of the sensor captured image database 140, the feature identification module 715 identifies one or more sensor captured images capturing a threshold a portion of the geographic region and the combination of features of interest. Each identified image is represented on the geographic spatial graphical user interface element 710 as an image capture outline 715. Each image capture outline 715 defines the boundaries of a geographic area as captured in a sensor captured image. In the illustrated embodiment of FIG. 7, each of the image capture outlines 715 cover the entirety of the geographic area "Boston." Therefore, the area selection graphical user interface element 560 indicates that on average, the accessed sensor captured images cover 100% of the area of interest. Had one of the image capture outline 715 covered only 50% of the geographic area of interest, the coverage reading in the area selection graphical user would indicate a percentage below 100%.

In addition to the geographic spatial graphical user interface element 710, the results display interface includes a timeline graphical user interface element 720. In the illustrated embodiment of FIG. 7, the timeline graphical user interface 720 is presented below to the to the geographic spatial graphical user interface element 510. However, in other embodiments, the area selection graphical user interface element 560 may overlay the map interface element 510 or be minimized, maximized, or repositioned relative to the map interface element in response to user input. As illustrated in FIG. 7, the timeline graphical user interface element 720 may be divided into segments 722 which are defined by the sampling period and the time tolerance. For example, in the illustrated embodiment of FIG. 7, the sampling period is set to 30 days and the time tolerance is set to 10 days. As a result, the timeline graphical user interface 720 is sampled every 30 days, for example on day 30, day 60, day 90, and so on. Because the time tolerance for each day is defined at 10 day, the sampling period is extended by 10 days preceding each sampling day and 10 days succeeding each sampling day. For example, the first sample would extend from day 20 to day 40, the second sample would extend from day 50 to day 70, the third sample would extend from day 80 to day 100, and so on.

Each extended sample is represented as a segment 722. Each segment 722 is illustrated on the timeline graphical user interface element 720 by a light shading overlaying the data of the timeline graphical user interface element 720. In alternate embodiments, segments 722 may be illustrated using an alternate representation.

Consistent with image capture outlines 715 illustrated in the geographic spatial graphical user interface element 710, the timeline graphical user interface displays one or more matching image identifier elements 724. Each matching image identifier element 724 is positioned along the horizontal axis of the timeline based on a time position at which the overhead image corresponding to matching image identifier element 724 was captured. Each matching image identifier element 724 indicates that a feature was detected in a sensor captured image. Accordingly, each image capture outline 715 correlates to a matching image identifier element 724. Depending on a capture time at which a sensor captured image was captured, a sensor captured image is either captured within a segment 722 or outside of a segment 722. In some embodiments, images captured outside of a segment 722, for exampling the image corresponding to the matching image identifier element 724 recorded between September 2018 and October 2018, are not presented to a user of the application interface 120. Accordingly, in the illustrated embodiment of FIG. 7, six of the seven samples include at least one matching image identifier element 724, with the exception being the segment occurring in September 2018. Accordingly, within each of the six segments, a sensor captured image capturing the geographic area and the feature of interest was detected. Accordingly, an indicator in area selection graphical user interface element 560 indicates that 6/7 periods included a sensor captured image. Matching image identifier elements 724 which fall outside of segment may be graphically represented as distinct from elements 724 which fall within a segment.

In some embodiments, segments 722 may not include any matching image identifier elements 724 thereby indicating that no sensor captured images capturing the geographic area and feature were detecting during that segment or certain matching image identifier elements 724 are excluded from all segments, thereby indicating the image was not capture during a sampling interval. In alternate embodiments, segments 722 may include multiple matching image identifier elements 724, thereby indicating that multiple sensor captured images capturing the geographic area and feature were detecting during that segment. In such embodiments, the feature identification module 131 may select a representative detection 726 from the multiple matching image identifier elements 724 within the single segment 722. In one embodiment, the feature identification module 131 compares each matching image identifier element 724 based on the minimum area coverage value, the maximum cloud coverage value, and the maximum incidence angle.

For example, the feature identification module 131 may determine a weighted average of the above listed parameters for each matching image identifier element 724 and selected the element 724 with the highest weighted average as the representative detection 726. Individual weights may be manually assigned to each parameter based on a user's preferences or automatically assigned based on a set of default weights. The weighted average may also be determined with consideration to other search parameters. After selecting a representative detection, the feature identification module 131 may communicate a set of instructions for the application interface to display the representative detection 726 with an identification or demarcation, for example a highlight (e.g., in a different color), distinguishing it from other matching image identifier elements 724 within the segment. In embodiments in which a segment 722 includes on a single matching image identifier element 724, that identifier element 724 may be updated to display as a representative detection 726 in a similar fashion. In other embodiments, the representative detection is selected from the one or more matching image identifiers within the segment based on sequentially filtering each overhead mage corresponding to the matching image identifier elements 724 by each of the plurality of parameters.

In another embodiment, a representative detection may be determined using a different set of sequential processing techniques. The feature identification module 131 may only consider a subset of sensor captured images recorded by a certain third-party provider or set of third-party providers. The image analysis algorithm implemented by the feature identification module 131 may only be effective on a specific kind of imagery recorded by a specific provider or set of providers. Of the considered images, the feature identification module 131 may compare each image to search parameters defined by a user (i.e., the maximum incidence angle, the maximum cloud coverage, and the minimum area coverage). Of the images consistent with the combination of search parameters, the feature identification module 131 identifies an image within each sample, if available. In embodiments in a sample includes multiple matching image identifier elements 724, the feature identification module 131 selects the matching image identifier element 724 associated with the greatest area coverage as the representative detection 726. In embodiments in which multiple image identifier elements 724 within a sample are associated with the same area coverage, the feature identification module 131 may select the matching image identifier closest to a desired time stamp, for example the center of the time period, as a representative detection 726.

Figure 8:
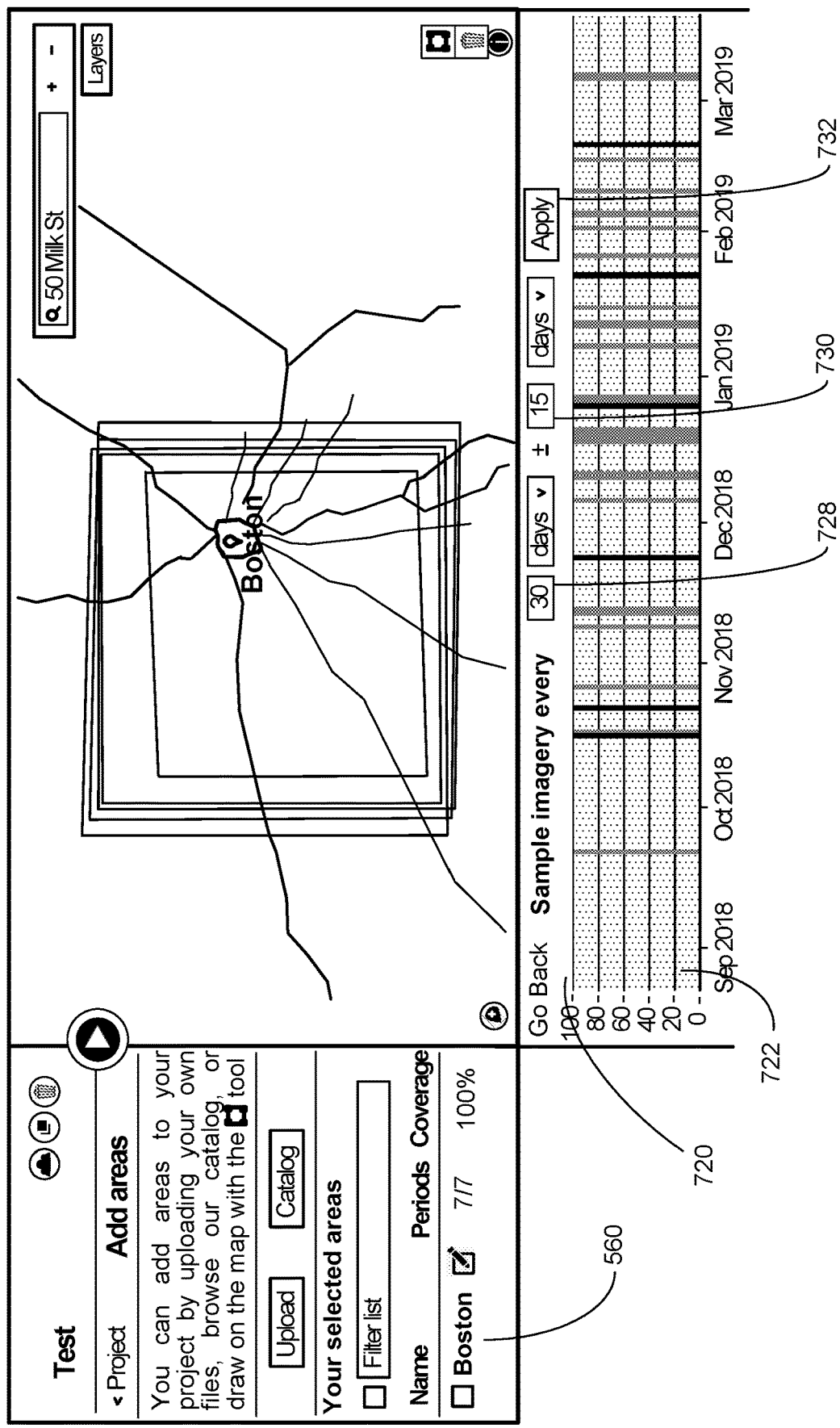
FIG. 8 illustrates a results display interface with an adjusted time tolerance, according to one embodiment.

Because a user may only be presented with sensor captured images recorded within segments 722, a user may be interested in dynamically adjusting the sampling period and/or time tolerance to capture one or matching image identifier elements 724 initially excluded from the segment 722. Accordingly, the timeline graphical user interface element 722 includes a set of adjustable interface elements, for example a sampling period adjustable interface element 728 and a time tolerance adjustable interface element 730. The sampling period adjustable interface element 728 and the time tolerance adjustable interface element 730 maybe functionally and graphically consistent with the description of the adjustable interface elements 334 and 336 described with reference to FIG. 3. FIG. 8 illustrates a results display interface with an adjusted time tolerance, according to one embodiment. The larger time tolerance, increased from 10 days to 15 days, expands each segment 722 such that the entire timeline graphical user interface element 720 is included in a segment 722. Accordingly, the previously excluded matching image identifier element 722 is now included in a segment and the user of the client device 110 may access the corresponding sensor captured image. Additionally, the area selection graphical user interface element 560 also reflects an updated count of the periods. The updated count indicates that under the new time tolerance, 7/7 periods now include a sensor captured image capturing the geographic region and the feature of interest.

Figure 9:
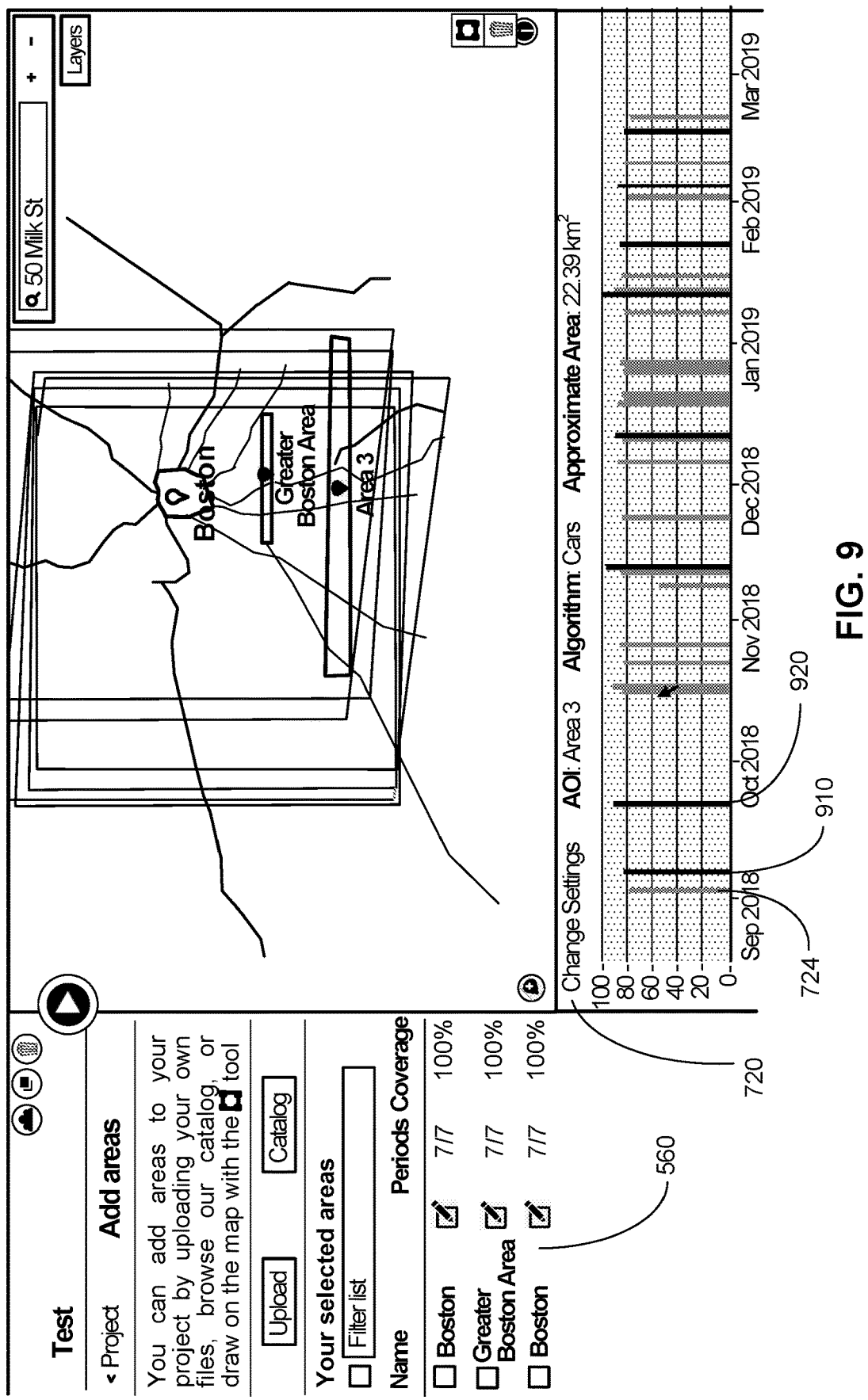
FIG. 9 illustrates a results display interface with matching image identifier elements of varying heights, according to one embodiment.

FIG. 9 illustrates a results display interface with matching image identifier elements of varying heights, according to one embodiment. The matching image identifier elements 724 may be represented as histogram bars. In such embodiments, the height dimension of each histogram bar may indicate a measurement of the amount of coverage of a sensor captured image corresponding to the identifier 724 over a geographic region. In other words, the height of the histogram bars are derived from a modification of the matching image identifier elements, which are derived from the available captured images, by the amount of coverage. For example, the representative detection 910 may be associated with a sensor captured image capturing a smaller percentage coverage of the geographic area than the representative detection 920. The histogram bars may also be considered a combination of the two independent data sets of the captured images and the geographic area(s) indicated by the user, as the intersection of these sets indicates the amount of coverage of the geographic areas by the images. In embodiments of the geographic spatial graphical user interface element which include multiple geographic areas, as illustrated in FIG. 9, the area search graphical user interface element may include period and coverage readings for each of the listed geographic regions.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for identifying sensor captured images capturing one or more features in a geographic region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    transmitting, by a network server, one or more computer readable instructions to a client device of a user to cause the client device to display a first graphical user interface element for revealing a feature in overhead images of a geographic area captured by a sensor, the first graphical user interface element including a plurality of data entry user interface elements for inputting a plurality of parameters, the plurality of parameters comprising a time range indicating a duration of time within which the overhead images of the geographic area were captured, a sampling period indicating a frequency at which overhead images are accessed within the time range; and a time tolerance indicating an interval by which the sampling period is extended, wherein the geographic area and the feature are selected by the user;
    receiving, at the network server, a plurality of data inputs corresponding to data entered by the user via the data entry user interface elements, each of the plurality of inputs indicating the time range, the sampling period, and the time tolerance;
    transmitting, by the network server, one or more computer readable instructions to the client device to cause the client device to display a second graphical user interface element, the second graphical user interface element comprising:
        a geographic spatial graphical user interface element displaying an outline of the geographic area and a plurality of image capture outlines as captured by the sensor at a capture time, each representing an overhead image of the area captured within the time range;
        a timeline graphical user interface element displaying one or more matching image identifier elements, each matching image identifier element corresponding to a detection of the feature in an overhead image of the geographic area, the timeline graphical user interface element further modifying the one or more matching image identifier elements within one or more highlighted segment graphical elements based on whether each matching image identifier element corresponds to the sampling periods, the modification comprising, a graphical indication of detections of the feature detected within the interval indicated by the time tolerance compared to detections of the feature detected outside the interval indicated by the time tolerance.

2. The method of claim 1, wherein the plurality of parameters of the first graphical element further comprise:
    a time type selector user interface element specifying whether the time range is one of a closed time range including a start time and an end time, an open-ended time range including a start time, and a single time.

3. The method of claim 1, wherein the plurality of parameters of the first graphical user interface element further comprise:
    a first value indicating a minimum area of coverage over the geographic area of an overhead image captured during the time range;
    a second value indicating a maximum cloud coverage over the geographic area when an overhead image was taken; and
    a third value indicating a maximum incidence angle of an overhead image of the geographic area.

4. The method of claim 3, further comprising:
    identifying, for each of the one or more highlighted segment graphical elements displayed within the timeline graphical user interface element, one or more matching image identifiers within the segment;
    comparing overhead images corresponding to each matching image identifier to overhead images corresponding to one or more remaining matching image identifiers within the highlighted segment graphical elements based on the plurality of parameters; and
    selecting, based on the comparison, a representative detection of the one or more matching image identifiers; and
    transmitting computer readable instructions to the client device to cause the client device to display a highlighted matching image identifier element corresponding to the representative detection with an identification distinct from other matching image identifier elements within the highlighted segment graphical element.

5. The method of claim 4, wherein the highlighted matching image identifier element is visually distinct from the matching image identifier elements.

6. The method of claim 4, wherein the representative detection is selected from the one or more matching image identifier elements within the segment based on sequentially filtering each overhead image corresponding to the one or more matching image identifier elements by each parameter of the plurality of parameters.

7. The method of claim 3, wherein the timeline graphical user interface element represents matching image identifier elements within the time range as histogram bars, the height dimension of the histogram bar adjusted to indicate a measurement an amount of coverage of the geographic area for the overhead image corresponding to the matching image identifier element.

8. The method of claim 1, wherein each matching image identifier element is positioned on a horizontal axis of the timeline graphical user interface element based on a time position at which the overhead image corresponding to the matching image identifier element was captured, the horizontal axis segmented based on intervals within which overhead images were accessed.

9. The method of claim 1, further comprising:
receiving, at the web server, one or more data inputs to a plurality of adjustable interface elements of the second graphical user interface element, wherein the inputs adjust at least one of the sampling period of the time tolerance; and
responsive to adjusting one of the sampling period or the time tolerance, transmitting computer readable instructions to the client device to cause the client device to update the timeline graphical user interface element of the second graphical user interface element to identify detections of the feature in the geographic area based on the adjusted sampling period and time tolerance.

10. The method of claim 1, further comprising:
transmitting, by the web server, one or more computer readable instructions to the client device to cause the client device to display a fourth graphical user interface element, the fourth graphical user interface element including a plurality of selectable interface elements identifying candidate features for detection;
responsive to receiving an input selecting at least one feature from the candidate features, performing an analysis of overhead images to detect the selected features based on the parameters of the first graphical yser interface element; and
transmitting one or more computer readable instructions to the client device to cause the client device to update the timeline graphical user interface element to display the second graphical user interface element based on the results of the analysis.

11. A method comprising:
transmitting, by a network server, one or more computer readable instructions to a client device of a user to cause the client device to display a first graphical user interface element for revealing a feature in overhead images of a geographic area captured by a sensor, the first graphical user interface element including a plurality of data entry user interface elements for inputting a plurality of parameters, the plurality of parameters comprising a time range indicating a duration of time within which the overhead images of the geographic area were captured, a sampling period indicating a frequency at which overhead images are accessed within the time range; and a time tolerance indicating an interval by which the sampling period is extended, wherein the geographic area and the feature are selected by the user;
receiving, at the network server, a plurality of data inputs corresponding to data entered by the user via the data entry user interface elements, each of the plurality of inputs indicating the time range, the sampling period, and the time tolerance;
transmitting, by the network server, one or more computer readable instructions to the client device to cause the client device to display a second graphical user interface element, the second graphical user interface element comprising:
a geographic spatial graphical user interface element displaying an outline of the geographic area and a plurality of image capture outlines as captured by the sensor at a capture time, each representing an overhead image of the area captured within the time range; and
a timeline graphical user interface element displaying one or more matching image identifier elements, each matching image identifier element corresponding to a detection of the feature in an overhead image of the geographic area, the timeline graphical user interface element further modifying the one or more matching image identifier elements within one or more highlighted segment graphical elements based on whether each matching image identifier element corresponds to the sampling period;
transmitting computer readable instructions to the client device of the user to cause the client device to display a third graphical user interface element, the third graphical user interface element including one or more graphical elements to identify the geographic area that is displayed on the second graphical user interface element; and
transmitting computer readable instructions to the client device to cause the client device to update a selection display interface element on the third graphical user interface element to indicate the geographic area, a count of intervals within which a feature was detected, and an average amount of coverage of the accessed overhead images for the time range, the count of intervals and the amount of coverage determined based on the matching image identifier elements displayed on the timeline graphical user interface element.

12. The method of claim 11, further comprising:
responsive to adjusting one of the graphical elements of the second graphical user interface element, transmitting computer readable instructions to the client device to cause the client device to update the selection display interface element to indicate an updated count of intervals within which the feature was detected, the updated count of intervals indicating a number of intervals of time within which overhead images were captured that have the feature.

13. The method of claim 11, further comprising:
receiving, at the network server, a plurality of inputs to the map graphical user interface element of the second graphical user interface element identifying boundaries for the geographic area;
receiving an input, at the web server, an input assigning a label to the geographic area; and
transmitting computer readable instructions to the client device to cause the client device to update the selection display interface element to include the labeled geographic area.

* * * * *